(12) United States Patent
Ferguson et al.

(10) Patent No.: US 10,203,696 B2
(45) Date of Patent: Feb. 12, 2019

(54) DETERMINING DRIVABILITY OF OBJECTS FOR AUTONOMOUS VEHICLES

(71) Applicant: Waymo LLC, Mountain View, CA (US)

(72) Inventors: David Ian Franklin Ferguson, San Francisco, CA (US); Andreas Wendel, Mountain View, CA (US); Zhinan Xu, Mountain View, CA (US); David Harrison Silver, Millbrae, CA (US); Brandon Douglas Luders, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 57 days.

(21) Appl. No.: 15/292,818

(22) Filed: Oct. 13, 2016

(65) Prior Publication Data

US 2018/0032078 A1 Feb. 1, 2018

Related U.S. Application Data

(60) Provisional application No. 62/366,885, filed on Jul. 26, 2016.

(51) Int. Cl.
  *G05D 1/02* (2006.01)
  *G06K 9/00* (2006.01)

(52) U.S. Cl.
  CPC ....... *G05D 1/0214* (2013.01); *G06K 9/00805* (2013.01); *G05D 1/0246* (2013.01); *G05D 2201/0213* (2013.01)

(58) Field of Classification Search
  None
  See application file for complete search history.

(56) References Cited

U.S. PATENT DOCUMENTS 8,676,431 B1 3/2014 Mariet et al.
9,188,980 B2 11/2015 Anderson
(Continued)

FOREIGN PATENT DOCUMENTS

WO 2014148978 A1 9/2014

OTHER PUBLICATIONS

Robert Oshana & Mark Kraeling, Software Engineering for Embedded Systems: Methods, Practical Techniques, and Applications 2013) (Year: 2013).*

(Continued)

*Primary Examiner* — Tamara L Weber
(74) *Attorney, Agent, or Firm* — Lerner, David, Littenberg, Krumholz & Mentlik, LLP

(57) ABSTRACT

Aspects of the disclosure relate to maneuvering a vehicle. As an example, sensor information identifying a set of objects as well as a set of characteristics for each object of the set of objects is received from a perception system of a vehicle. The set of objects is filtered to remove objects corresponding to vehicles, bicycles, and pedestrians. An object within an expected future path of the vehicle is selected from the filtered set of objects. The object is classified as drivable or not drivable based on the set of characteristics. Drivable indicates that the vehicle can drive over the object without causing damage to the vehicle. The vehicle is maneuvered based on the classification such that when the object is classified as drivable, maneuvering the vehicle includes driving the vehicle over the object by not altering the expected future path of the vehicle.

20 Claims, 9 Drawing Sheets

(56) References Cited

U.S. PATENT DOCUMENTS

| | | |
|---|---|---|
| 9,234,618 B1 | 1/2016 | Zhu et al. |
| 9,381,916 B1 | 7/2016 | Zhu et al. |
| 9,481,367 B1* | 11/2016 | Gordon ................. B60W 30/09 |
| 9,612,123 B1* | 4/2017 | Levinson ................. G01C 21/32 |
| 2007/0219720 A1 | 9/2007 | Trepagnier et al. |
| 2011/0001825 A1 | 1/2011 | Hahn |
| 2015/0054636 A1 | 2/2015 | Sangorrin et al. |
| 2015/0151725 A1* | 6/2015 | Clarke ................. B60W 30/00 701/28 |
| 2016/0170414 A1* | 6/2016 | Chen .................... G05D 1/0088 701/27 |
| 2016/0292905 A1* | 10/2016 | Nehmadi ................. G01S 17/08 |
| 2017/0339820 A1* | 11/2017 | Foster ................. A01B 69/007 |

OTHER PUBLICATIONS

Joel Pazhayampallil; "Free space detection with deep nets for autonomous driving"; publication date Mar. 28, 2015; http://cs231n.stanford.edu/reports/jpazhaya_final.pdf.

International Search Report and Written Opinion for PCT Application No. PCT/US2017/043007 dated Oct. 23, 2017. 16 pages.

\* cited by examiner

DETERMINING DRIVABILITY OF OBJECTS FOR AUTONOMOUS VEHICLES

CROSS-REFERENCE TO RELATED APPLICATION

The present application claims the benefit of the filing date of U.S. Provisional Patent Application No. 62/366,885 filed Jul. 26, 2016, the entire disclosure of which is incorporated by reference herein.

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a destination, and the vehicle maneuvers itself to that destination.

An important component of an autonomous vehicle is the perception system, which allows the vehicle to perceive and interpret its surroundings using cameras, radar, sensors, and other similar devices. The perception system executes numerous decisions while the autonomous vehicle is in motion, such as speeding up, slowing down, stopping, turning, etc. Autonomous vehicles may also use the cameras, sensors, and global positioning devices to gather and interpret images and sensor data about its surrounding environment, e.g., parked cars, trees, buildings, etc. These images and sensor data allow the vehicle to safely maneuver itself around various objects.

BRIEF SUMMARY

One aspect of the disclosure provides a method of maneuvering a vehicle. The method includes receiving, by one or more processors from a perception system of the vehicle, sensor information identifying a set of objects as well as a set of characteristics for each object of the set of objects; filtering, by the one or more processors, the set of objects to remove objects corresponding to vehicles, bicycles, and pedestrians; selecting, by the one or more processors, from the filtered set of objects, an object within an expected future path of the vehicle; classifying, by the one or more processors, the object as drivable or not drivable based on the set of characteristics wherein drivable indicates that the vehicle can drive over the object without causing damage to the vehicle; and maneuvering, by the one or more processors, the vehicle based on the classification such that when the object is classified as drivable, maneuvering the vehicle includes driving the vehicle over the object by not altering the expected future path of the vehicle.

In one example, the set of characteristics includes a location of the object, and the method further comprises prior to classifying, determining that the object was not included in pre-stored map information describing a driving environment of the vehicle at the location. In another example, the receiving of the sensor information occurs when the vehicle is approaching the object such that the classification and maneuvering are performed in real time. In another example, when the classification is not drivable, maneuvering the vehicle includes altering the expected future path of the vehicle to avoid driving over the object. In another example, the method also includes when an object is classified as not drivable, further classifying the object as not drivable but likely to move out of the way (or rather, out of the way of an expected future path of the vehicle). In this example, when the object is classified as not drivable but likely to move out of the way, maneuvering the vehicle includes slowing the vehicle down as the vehicle approaches the object. In another example, the filtering further includes filtering the set of objects to remove objects not within a lane in which the vehicle is currently traveling. In another example, the filtering further includes filtering the set of objects to remove objects having at height that meets a predetermined height threshold. In another example, the filtering further includes filtering the set of objects to remove objects having a predetermined shape.

Another aspect of the disclosure provides a system for maneuvering a vehicle. The system includes one or more processors configured to: receive, from a perception system of the vehicle, sensor information identifying a set of objects as well as a set of characteristics for each object of the set of objects; filter the set of objects to remove objects corresponding to vehicles, bicycles, and pedestrians; select from the filtered set of objects, an object within an expected future path of the vehicle; classify the object as drivable or not drivable based on the set of characteristics wherein drivable indicates that the vehicle can drive over the object without causing damage to the vehicle; and maneuver the vehicle based on the classification such that when the object is classified as drivable, maneuvering the vehicle includes driving the vehicle over the object by not altering the expected future path of the vehicle.

In one example, the system also includes the vehicle. In another example, the set of characteristics includes a location of the object, and the one or more processors are further configured to, prior to classifying, determining that the object was not included in pre-stored map information describing a driving environment of the vehicle at the location. In another example, the one or more processors are further configured such that when the receiving of the sensor information occurs when the vehicle is approaching the object, the classification and maneuvering are performed in real time. In another example, when the classification is not drivable, the one or more processors are further configured to maneuver the vehicle by altering the expected future path of the vehicle to avoid driving over the object. In another example, when an object is classified as not drivable, the one or more processors are further configured to further classify the object as not drivable but likely to move out of the way. In this example, when the object is classified as not drivable but likely to move out of the way, the one or more processors are further configured to maneuver the vehicle by slowing the vehicle down as the vehicle approaches the object. In this example, the one or more processors are further configured to filter the set of objects by also removing objects not within a lane in which the vehicle is currently traveling. In another example, the one or more processors are further configured to filter the set of objects by also removing objects having at height that meets a predetermined height threshold. In another example, the one or more processors are further configured to filter the set of objects by also removing objects having a predetermined shape.

A further aspect of the disclosure provides a non-transitory computer readable storage medium on which instructions are stored. The instructions, when executed by one or more processors cause the one or more processors to perform a method for maneuvering a vehicle. The method includes receiving, from a perception system of the vehicle, sensor information identifying a set of objects as well as a set of characteristics for each object of the set of objects; filtering the set of objects to remove objects corresponding to vehicles, bicycles, and pedestrians; selecting from the filtered set of objects, an object within an expected future path of the vehicle; classifying the object as drivable or not drivable based on the set of characteristics wherein drivable indicates that the vehicle can drive over the object without causing damage to the vehicle; and maneuvering the vehicle based on the classification such that when the object is classified as drivable, maneuvering the vehicle includes driving the vehicle over the object by not altering the expected future path of the vehicle.

DETAILED DESCRIPTION

Figure 1:
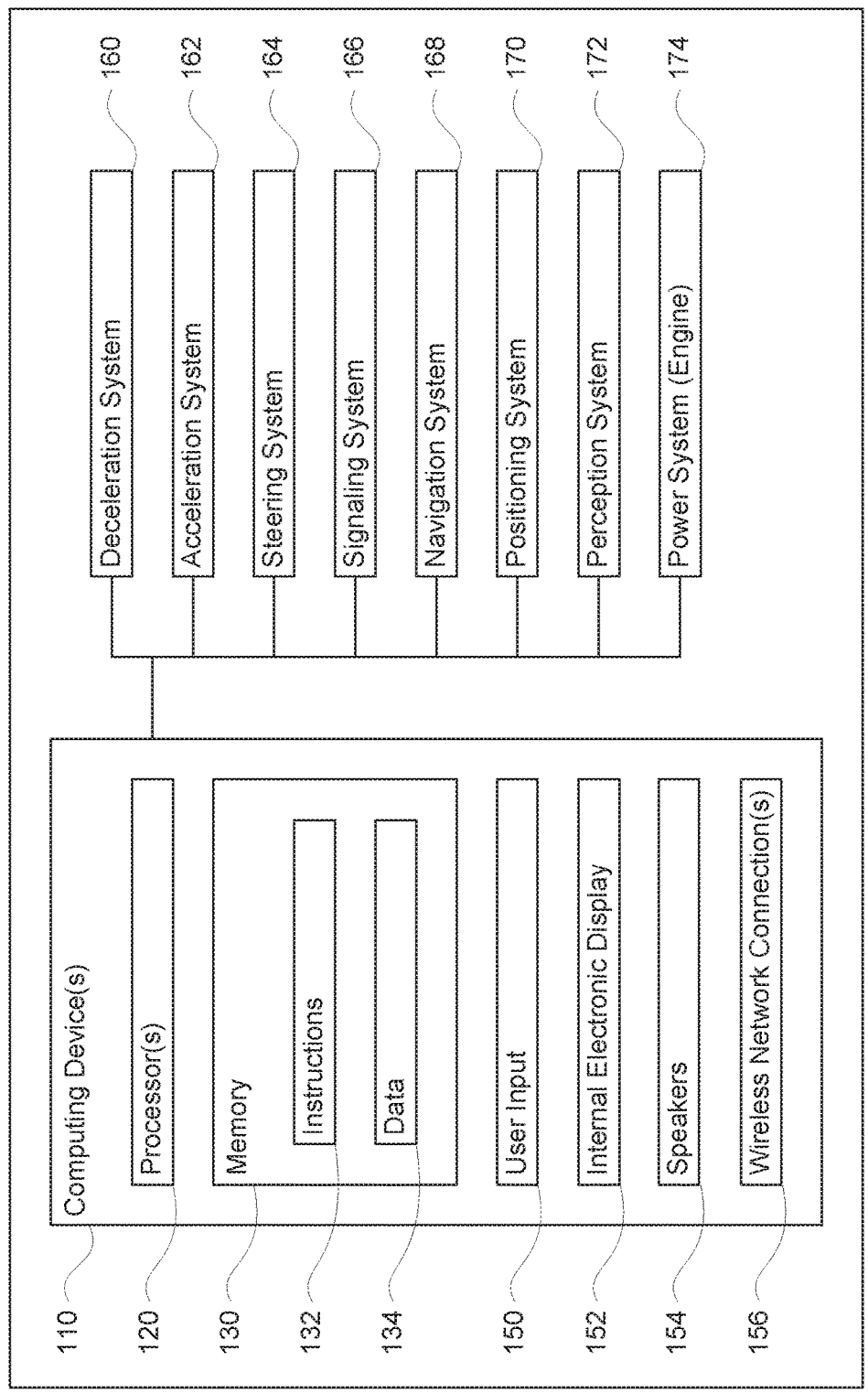
FIG. 1 is a functional diagram of an example vehicle in accordance with aspects of the disclosure.

The technology relates to perception systems for autonomous vehicles that detect and identify objects in the vehicle's environment. While detecting and identifying objects is a typical activity for such systems, it can be difficult for these systems to differentiate between objects which the vehicle must drive around to avoid an accident versus objects which the vehicle need not drive around, but can actually drive over. For instance, it can be difficult to differentiate among objects such as paper, plastic bags, leaves, etc. (which can be driven over quite readily but should not be driven over), objects such as a low small piece of scrap metal (which can be driven over if straddled between two wheels of the vehicle, such as between the front two wheels of the vehicle), small animals such as squirrels, birds, chipmunks, etc. (which are likely to move out of the way on their own), and objects such as bricks, concrete, or other debris (which could damage a vehicle if driven over). As a result, autonomous vehicles often stop abruptly for objects or drive around objects, by swerving or changing lanes, which could simply be driven over. By determining "drivability" of objects and differentiating between objects that can be driven over and those that cannot (or should not), such maneuvers can be avoided and the overall safety of the vehicle can be improved.

As noted above, the vehicle's perception system may use various sensors, such as LIDAR, sonar, radar, cameras, etc. to detect objects and their characteristics. These characteristics may include, for example, location, dimensions, direction of motion, velocity, shape, density, reflectivity, intensity, texture, etc. Thus, the vehicle's computing devices may use sensor information corresponding to objects detected by the various sensors as well as their characteristics. In this regard, the sensor information may include raw sensor data or other information describing the characteristics such as a descriptive function or vector.

Autonomous vehicles may rely on information received from the perception system in combination with pre-stored map information describing features of the vehicle's environment. For instance, the map information may describe the shape and orientation of road features such as the road surface, lane markers, curbs, crosswalks, etc. However, the pre-stored map information would not include transient features such as other vehicles or road debris.

The vehicle's computer systems may include a classifier trained to classify detected objects as drivable or not drivable. For instance, the classifier may be trained by providing the classifier with seed data including sensor information as well as a classification (drivable or not drivable). The classification may be automatically or manually generated by evaluating whether the vehicle or any detected vehicles drove over the object. Using machine learning techniques, over time, the more information provided to the classifier, the greater the accuracy in the classification results.

As the vehicle is maneuvered along and the perception system detects objects in the vehicle's environment, the sensor information for a detected object which was not included in or otherwise identified by pre-stored map information may be used as input into a classifier. In order to further limit unnecessary classification of objects, the classifier may be sent sensor information for pre-filtered objects, such as for objects in the same lane as the vehicle or near its intended path, i.e. the objects that the vehicle may potentially drive over if the vehicle continues on a current route or trajectory, objects that are determined not to be or highly unlikely to be people, bicyclists, other vehicles, etc. Similarly, the classifier may also only be sent sensor information for objects for which drivability is not clear based on geometry and/or size alone. For instance, an object is very large (such as close to bumper height) it is unlikely a vehicle would ever want to drive over it).

The classifier may then classify the drivability of a particular object, or rather, a determination of whether the object is drivable safe for the vehicle to drive over or not in real time. Each classification may be provided with a confidence value indicative of the likelihood that the object is safe for the vehicle to drive over or not. This confidence value may be compared with a threshold value to determine whether the object is to be classified as drivable or not drivable.

The classification may then be used to control the vehicle. For instance, as an example, if an object is identified as drivable, the vehicle may proceed to drive over the object. Alternatively, if an object is classified as not drivable, the vehicle may stop or maneuver around the object. As noted above, by classifying the drivability of objects, unnecessary maneuvering or stopping, for instance to avoid a plastic bag or other similar debris, can be avoided. This can allow the vehicle to have smoother responses to an object (such as slowing down gradually before driving over an object as opposed to abruptly stopping) thereby reducing the likelihood of accidents with other vehicles caused by sudden unexpected stops. In some ways, this allows the vehicle to behave more like it is being controlled by a human driver rather than an independent computing device. This can have an effect on the way drivers of other vehicles perceive the vehicle. For instance, if a driver sees a plastic bag, he would expect the vehicle to drive over it, rather than stop abruptly. In addition, these benefits may extend to any passengers within the vehicle, allowing them a more comfortable and less stressful ride.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The data 134 may be retrieved, stored or modified by processor 120 in accordance with the instructions 132. The data 134 may include one or more threshold values that can be used by the computing device to make determinations regarding the drivability of objects as discussed in further detail below.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

As an example, the instructions may include a classifier trained to classify detected objects as drivable or not drivable. For instance, the classifier may be trained by providing the classifier with seed data including sensor information as well as a classification. As an example, the classification may be fairly simple, such as a binary drivable or not drivable (could cause damage to the vehicle or injury to passengers) designation, or more complex, such as drivable, drivable if straddled between wheels of the vehicle (such as an object with a low profile), not drivable, and not drivable but likely to move away on its own (such as a small animal) designation. The seed data may be used to "train" or configure a model of the classifier that when provided with sensor information will output a classification.

The classification may be automatically or manually generated by evaluating whether the vehicle or any detected vehicles drove over the object. For instance, if a vehicle, with or without a human driver, was observed driving over an object in the roadway that object, or rather the sensor information for that object, the object may be classified as drivable. In some of these observations, if the observed vehicle driving over the object maneuvered itself in order to straddle the object between wheels of the observed vehicle, the object may be classified as drivable if straddled between wheels of the vehicle. If a vehicle, with or without a human driver, was observed avoiding an object in the roadway by slowing down, changing lanes, or otherwise moving around the object, the object, or rather the sensor information for that object, may be classified as not drivable. In another example, if an object was observed moving out of the way of a vehicle as the vehicle approached the object, that object may be classified as likely to move away, for instance, from the path of an approaching vehicle, on its own, such as a small animal.

In many cases, the type of an object may be relevant to the classification. For instance, the type of an object may be determined using any known classification techniques, such as machine learning, image recognition, etc. The type may then be fed into the classifier to determine the drivable or not drivable classification of the object. Alternatively, sub-classifications within these classifications may also be made by the classifier corresponding to the type of the object. For instance, in the case of an object classified as drivable, the object may be further classified by the type of drivable object such as paper, plastic bag, leaves, etc. Similarly, in the case of an object classified as not drivable but likely to move out of the way on its own, the object may be further classified as a squirrel, bird, chipmunk, etc. As another example, in the case of an object classified as not drivable, the object may be further classified in any number of sub-classifications such as not drivable but likely to move out of the way on its own, not drivable and not likely to move out of the way on its own, brick, concrete, other debris, etc.

As new sensor information is input into the model to be classified by the classifier, objects of the new sensor information may be classified. In addition, each classification will be associated with a confidence value. This confidence value provides an accuracy estimate for the actual classification. For instance, sensor information defining characteristics of an object, such as the shape, height or other dimensions, location, speed, color, object type, etc. of a squirrel, depending on the classification designations for the classifier, the output of the classifier may be that the object is 0.05 or 5% likely to be drivable, 0.95 or 95% likely to be not drivable, and 0.8 or 80% not drivable but likely to move away on its own. Of course, this is merely an example, and the confidence values for objects may vary based upon the sensor information provided to the classifier. In addition, the confidence values may correspond to a particular scaled value, for instance on a range of −1 to 0, 0-1, 1 to 100, 0.00-1.0, etc., though any number of different scale values may be used.

Using machine learning techniques, over time, the more information provided to the classifier, the greater the accuracy in the classification results, or rather, the confidence value for the classifications may also increase. Any machine learning classification techniques may be used such as deep learning, support vector machine (SVM) models, decision forests, cascade classifiers. In addition, the machine learning techniques can even be improved over time by incorporating additional observations as well as using sensor information including raw sensor data combined with extracted features identified from the raw sensor data as discussed further below.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. As an example, internal electronic display 152 may be controlled by a dedicated computing device having its own processor or central processing unit (CPU), memory, etc. which may interface with the computing device 110 via a high-bandwidth or other network connection. In some examples, this computing device may be a user interface computing device which can communicate with a user's client device. Similarly, the memory may be a hard drive or other storage media located in a housing different from that of computing device 110. Accordingly, references to a processor or computing device will be understood to include references to a collection of processors or computing devices or memories that may or may not operate in parallel.

Computing device 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing device 110 to provide information to passengers within the vehicle 100. In addition to internal speakers, the one or more speakers 154 may include external speakers that are arranged at various locations on the vehicle in order to provide audible notifications to objects external to the vehicle 100.

In one example, computing device 110 may be an autonomous driving computing system incorporated into vehicle 100. The autonomous driving computing system may capable of communicating with various components of the vehicle. For example, returning to FIG. 1, computing device 110 may be in communication with various systems of vehicle 100, such as deceleration system 160 (for controlling braking of the vehicle), acceleration system 162 (for controlling acceleration of the vehicle), steering system 164 (for controlling the orientation of the wheels and direction of the vehicle), signaling system 166 (for controlling turn signals), navigation system 168 (for navigating the vehicle to a location or around objects), positioning system 170 (for determining the position of the vehicle), perception system 172 (for detecting objects in the vehicle's environment), and power system 174 (for example, a battery and/or gas or diesel powered engine) in order to control the movement, speed, etc. of vehicle 100 in accordance with the instructions 132 of memory 130 in an autonomous driving mode which does not require or need continuous or periodic input from a passenger of the vehicle. Again, although these systems are shown as external to computing device 110, in actuality, these systems may also be incorporated into computing device 110, again as an autonomous driving computing system for controlling vehicle 100.

The perception system 172 also includes one or more components for detecting objects external to the vehicle such as other vehicles, obstacles in the roadway, traffic signals, signs, trees, etc. In the case where the vehicle is a small passenger vehicle such as a car, the car may include a laser or other sensors mounted on the roof or other convenient location. For instance, a vehicle's perception system may use various sensors, such as LIDAR, sonar, radar, cameras, etc. to detect objects and their characteristics such as location, orientation, size, shape, type, direction and speed of movement, etc.

The perception system 172 may thus use the sensors to generate the sensor information discussed above identifying various objects and their characteristics. These characteristics may include, for example, location, dimensions, direction of motion, velocity, shape, density, reflectivity, intensity, texture, type, etc. For instance, objects such as vehicles, pedestrians and bicyclists may be readily identifiable from their visual characteristics (using image recognition techniques), physical characteristics (size, shape, etc.), speed (relative to the vehicle 100 or actual speed), and location (in a lane, in a crosswalk, on a sidewalk, etc.) captured by lasers or camera sensors of the perception system. Of course, the same may not be true for road debris, small animals, or other such items which can appear in the roadway. This sensor information may be sent to and received by the computing device 110. In this regard, the sensor information may include raw sensor data and/or other information describing the characteristics extracted from the raw sensor data such as a descriptive function or vector.

Figure 3A:
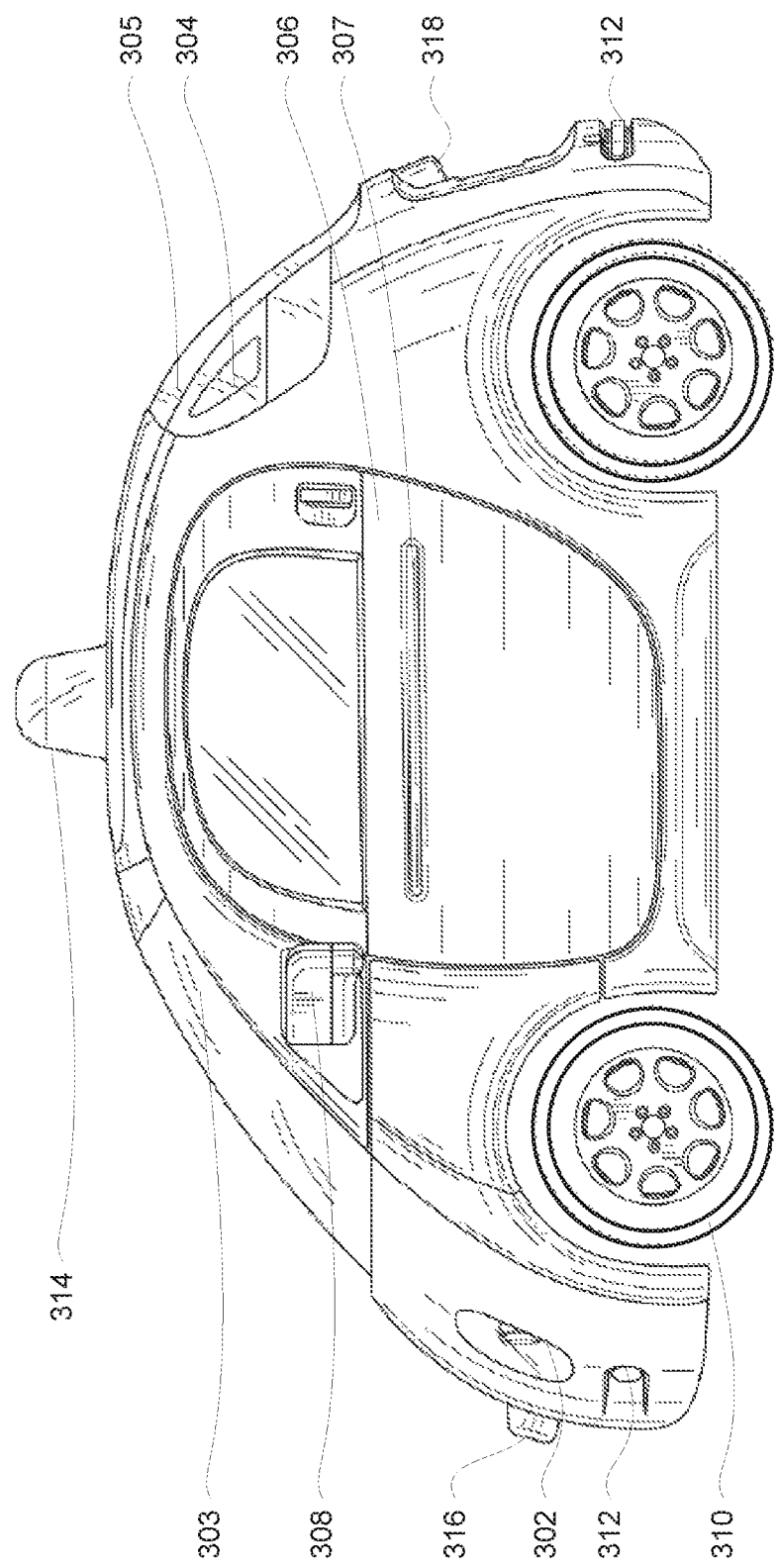
FIGS. 3A-3D are example external views of a vehicle in accordance with aspects of the disclosure.
Figure 3C:
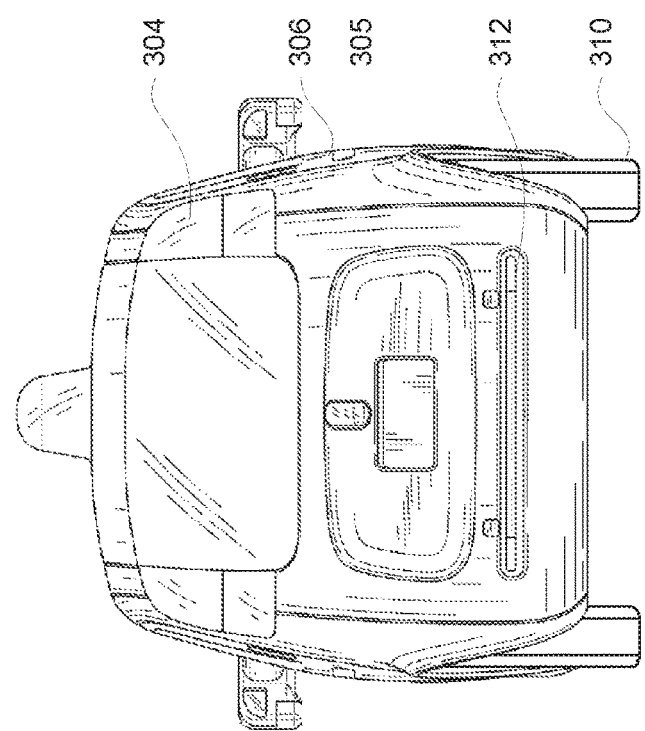
Figure 3B:
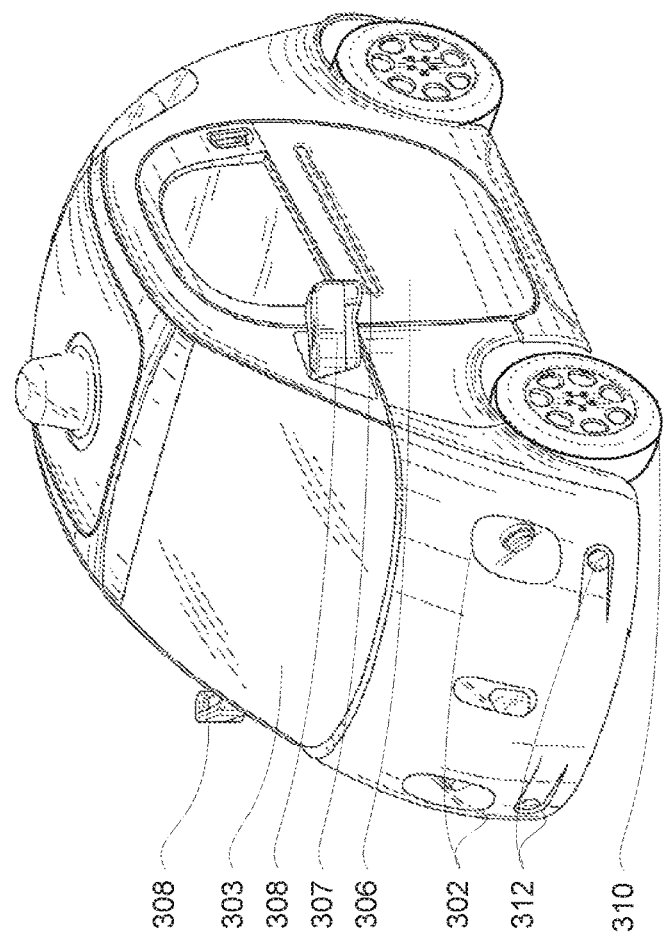
Figure 3D:
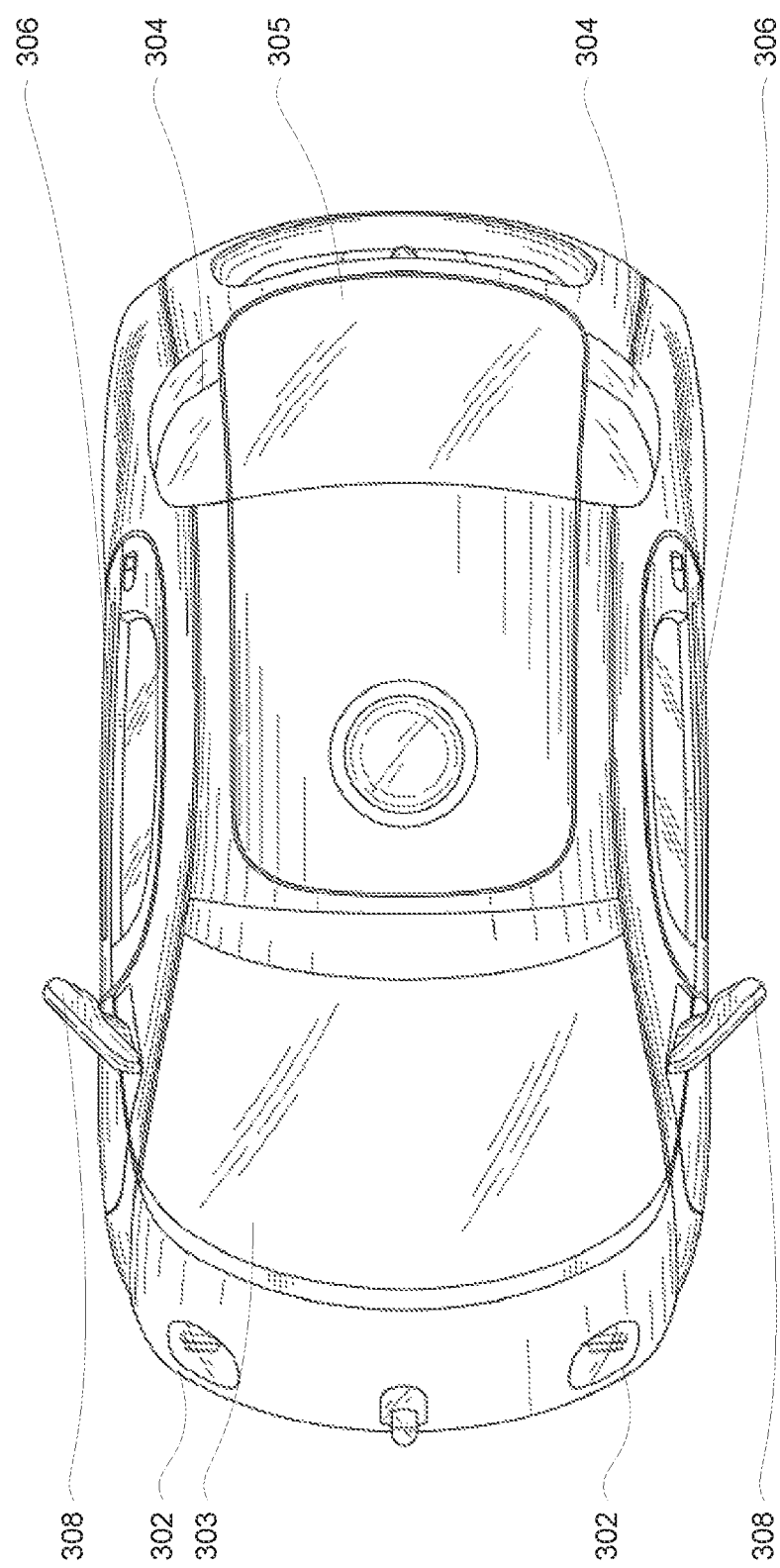

Vehicle 100 also includes sensors of the perception system 172. For example, housing 314 (see FIG. 3A) may include one or more laser devices for having 360 degree or narrower fields of view and one or more camera devices. Housings 316 and 318 may include, for example, one or more radar and/or sonar devices. The devices of the perception system may also be incorporated into the typical vehicle components, such as taillights/turn signal lights 304 and/or side view mirrors 308. Each of these radar, camera, and lasers devices may be associated with processing components which process data from these devices as part of the perception system 172 and provide sensor data to the computing device 110.

The computing device 110 may control the direction and speed of the vehicle by controlling various components. By way of example, computing device 110 may navigate the vehicle to a destination location completely autonomously using data from map information and navigation system 168 (discussed further below). The computing device 110 may use the positioning system 170 to determine the vehicle's location and perception system 172 to detect and respond to objects when needed to reach the location safely. In order to do so, computer 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computer 110 may also control the drivetrain of the vehicle in order to maneuver the vehicle autonomously.

As an example, computing device 110 may interact with deceleration system 160 and acceleration system 162 in order to control the speed of the vehicle. Similarly, steering system 164 may be used by computing device 110 in order to control the direction of vehicle 100. For example, if vehicle 100 configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 134 may store map information, e.g., highly detailed maps describing expected features of the vehicle's environment that computing devices 110 can use to navigate or control the vehicle pre-stored map information. As an example, these maps may identify the shape and elevation of roadways, lane markers, intersections, crosswalks, speed limits, traffic signal lights, buildings, signs, real time traffic information, vegetation, or other such objects and information. The lane markers may include features such as solid or broken double or single lane lines, solid or broken lane lines, reflectors, etc. A given lane may be associated with left and right lane lines or other lane markers that define the boundary of the lane. Thus, most lanes may be bounded by a left edge of one lane line and a right edge of another lane line. For instance, the map information may describe the shape and orientation of road features such as the road surface, lane markers, curbs, crosswalks, etc. However, this map information would not include transient features such as other vehicles or road debris.

Figure 2:
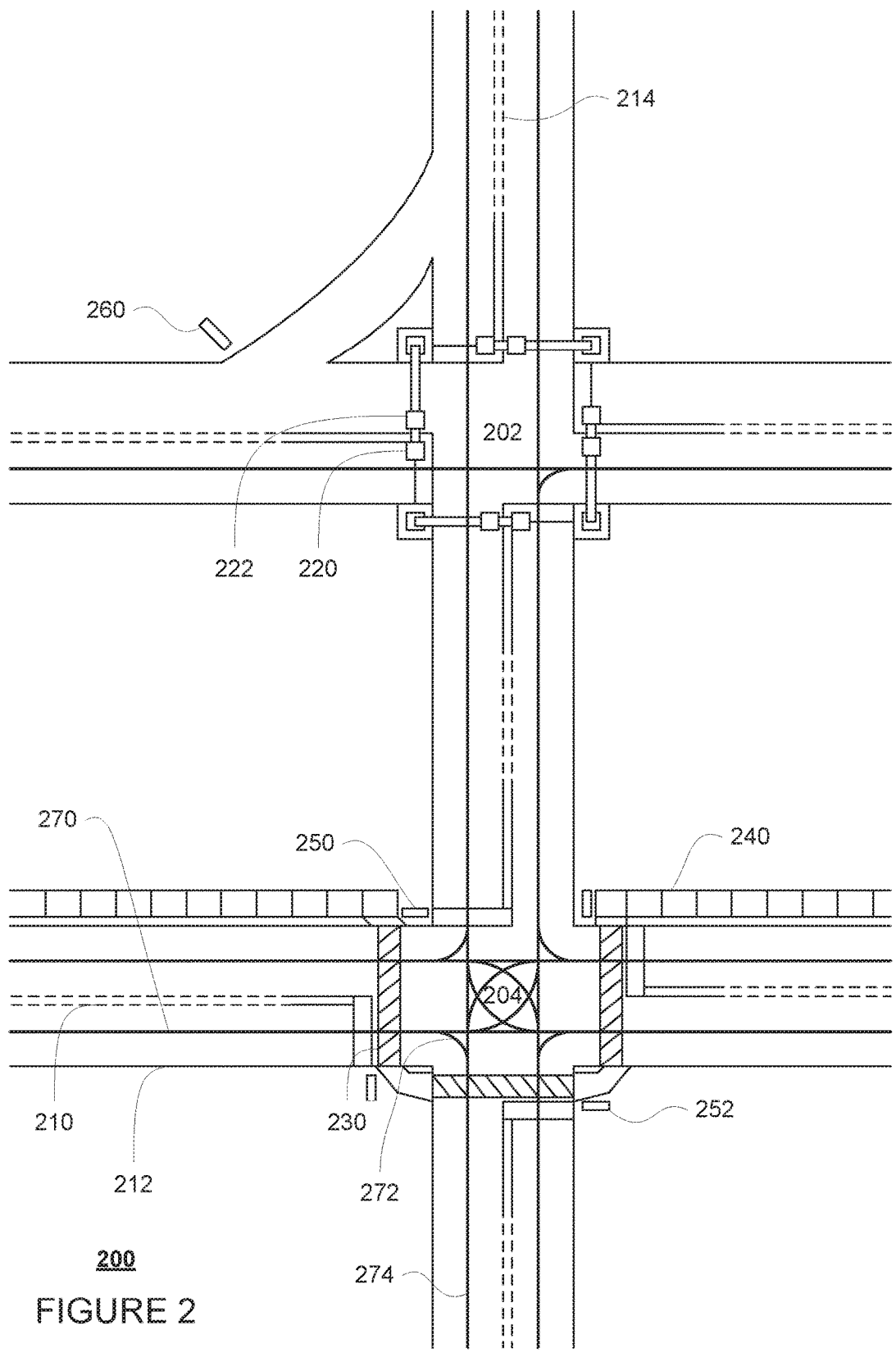
FIG. 2 is an example representation of pre-stored map information in accordance with aspects of the disclosure.

FIG. 2 is an example of map information 200 for a section of roadway including intersections 202 and 204. In this example, the map information 200 includes information identifying the shape, location, and other characteristics of lane lines 210, 212, 214, traffic signal lights 220, 222, crosswalks 230, sidewalks 240, stop signs 250, 252, and yield sign 260. Areas where the vehicle can drive may be associated with one or more rails 270, 272, and 274 which indicate the location and direction in which a vehicle should generally travel at various locations in the map information. For example, a vehicle may follow rail 270 when driving in the lane between lane lines 210 and 212, and may transition to rail 272 in order to make a right turn at intersection 204. Thereafter the vehicle may follow rail 274. Of course, given the number and nature of the rails only a few are depicted in map information 200 for simplicity and ease of understanding.

Although the detailed map information is depicted herein as an image-based map, the map information need not be entirely image based (for example, raster). For example, the detailed map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

FIGS. 3A-3D are examples of external views of vehicle 100. As can be seen, vehicle 100 includes many features of a typical vehicle such as headlights 302, windshield 303, taillights/turn signal lights 304, rear windshield 305, doors 306, side view mirrors 308, tires and wheels 310, and turn signal/parking lights 312. Headlights 302, taillights/turn signal lights 304, and turn signal/parking lights 312 may be associated the signaling system 166. Light bar 307 may also be associated with the signaling system 166. As noted above, vehicle 100 may include various speakers arranged on the external surfaces of the vehicle corresponding to the one or more speakers 154 as noted above.

Figure 4:
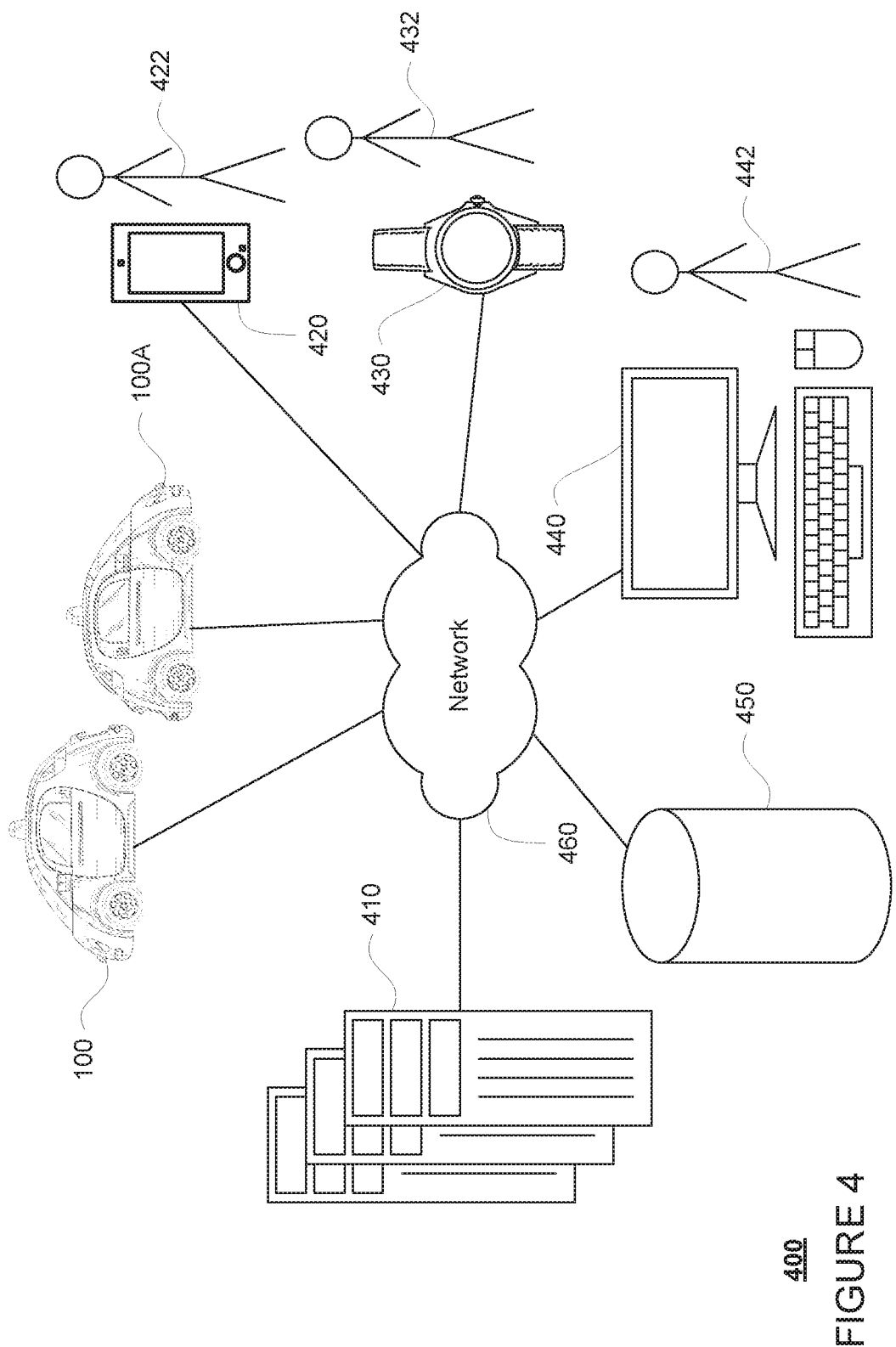
FIG. 4 is a functional diagram of an example system in accordance with an exemplary embodiment.
Figure 5:
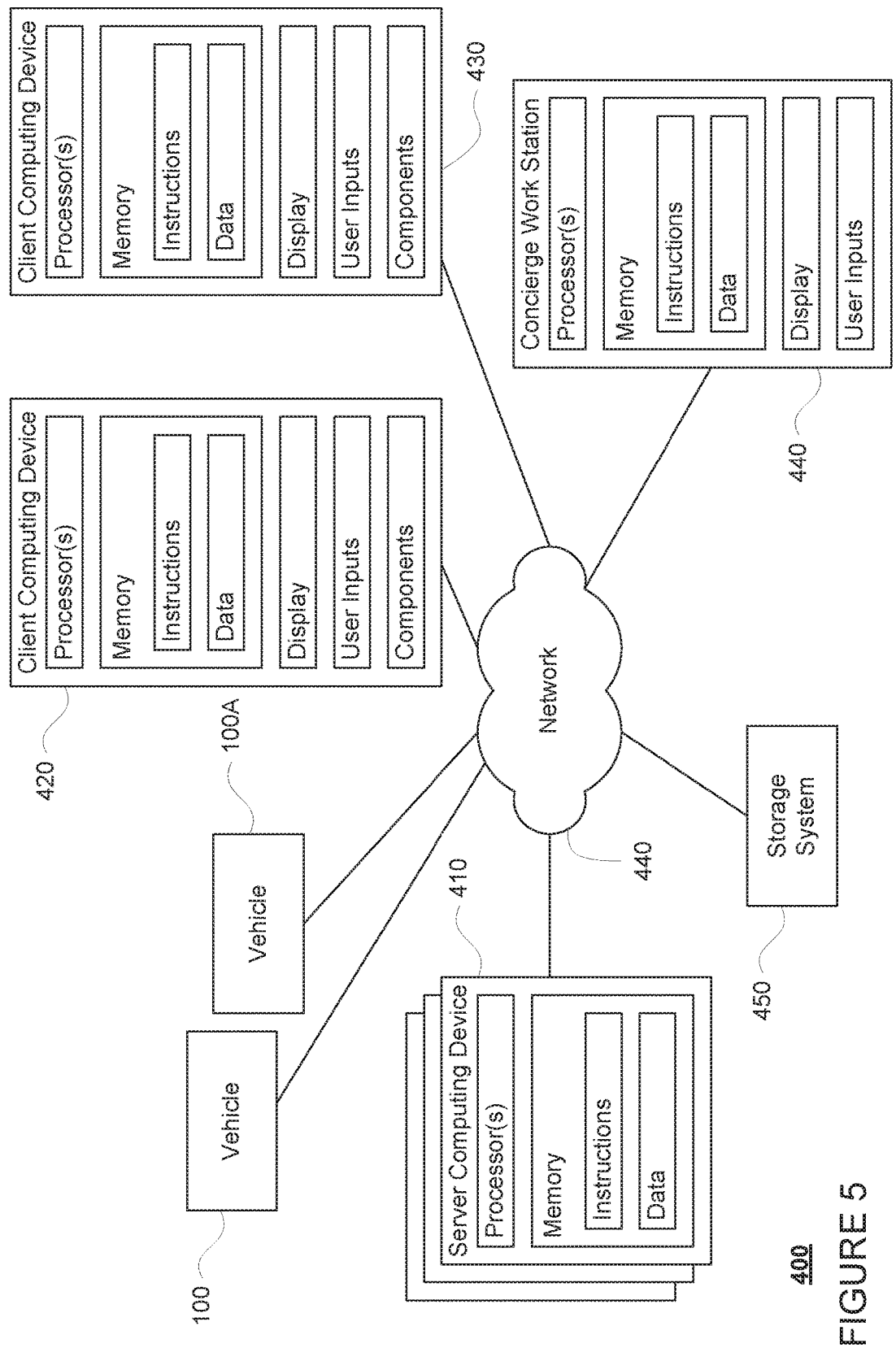
FIG. 5 is a pictorial diagram of the system of FIG. 6 in accordance with aspects of the disclosure.

The one or more computing devices 110 of vehicle 100 may also receive or transfer information to and from other computing devices, for instance, via wireless network connections 156. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100, and vehicle 100A which may be configured similarly to vehicle 100. Although only a few vehicles and computing devices are depicted for simplicity, a typical system may include significantly more.

As shown in FIG. 4, each of computing devices 410, 420, 430, 440 may include one or more processors, memory, data and instructions. Such processors, memories, data and instructions may be configured similarly to one or more processors 120, memory 130, data 134, and instructions 132 of computing device 110.

The network 460, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include a server having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with one or more computing devices 110 of vehicle 100 or a similar computing device of vehicle 100A as well as client computing devices 420, 430, 440 via the network 460. For example, vehicles 100 and 100A may be a part of a fleet of vehicles that can be dispatched by server computing devices to various locations. In this regard, the vehicles of the fleet may periodically send the server computing devices location information provided by the vehicle's respective positioning systems and the one or more server computing devices may track the locations of the vehicles. In addition, client computing devices 420, 430, 440 may be associated with or used by users 422, 432, and 442, respectively, that allow the users to communicate with the various other computing devices of the system.

Storage system 450 may store various types of information such as the classifier discussed above. In this regard, the classifier may be at least initially trained "offline", for instance using the server computing devices 410 and later downloaded to one or both of vehicles 100 and 100A, for instance via the network 460 or a wired connect (for faster download speeds). As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIG. 4 and/or may be directly connected to or incorporated into any of the computing devices 110, 410, 420, 430, 440, etc.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Computing device 110 may initiate the necessary systems to control the vehicle autonomously along a route to the destination location. For instance, the navigation system 168 may use the map information of data 134 to determine a route or path to the destination location that follows a set of connected rails of map information 200. The computing device 110 may then maneuver the vehicle autonomously (or in an autonomous driving mode) as described above along the route towards the destination. In order to do so, the vehicle's computing device 110 may create a plan identifying the locations, speeds and orientations of the vehicles along the route. Together, these locations, speeds and orientations define an expected future path of the vehicle.

Figure 6:
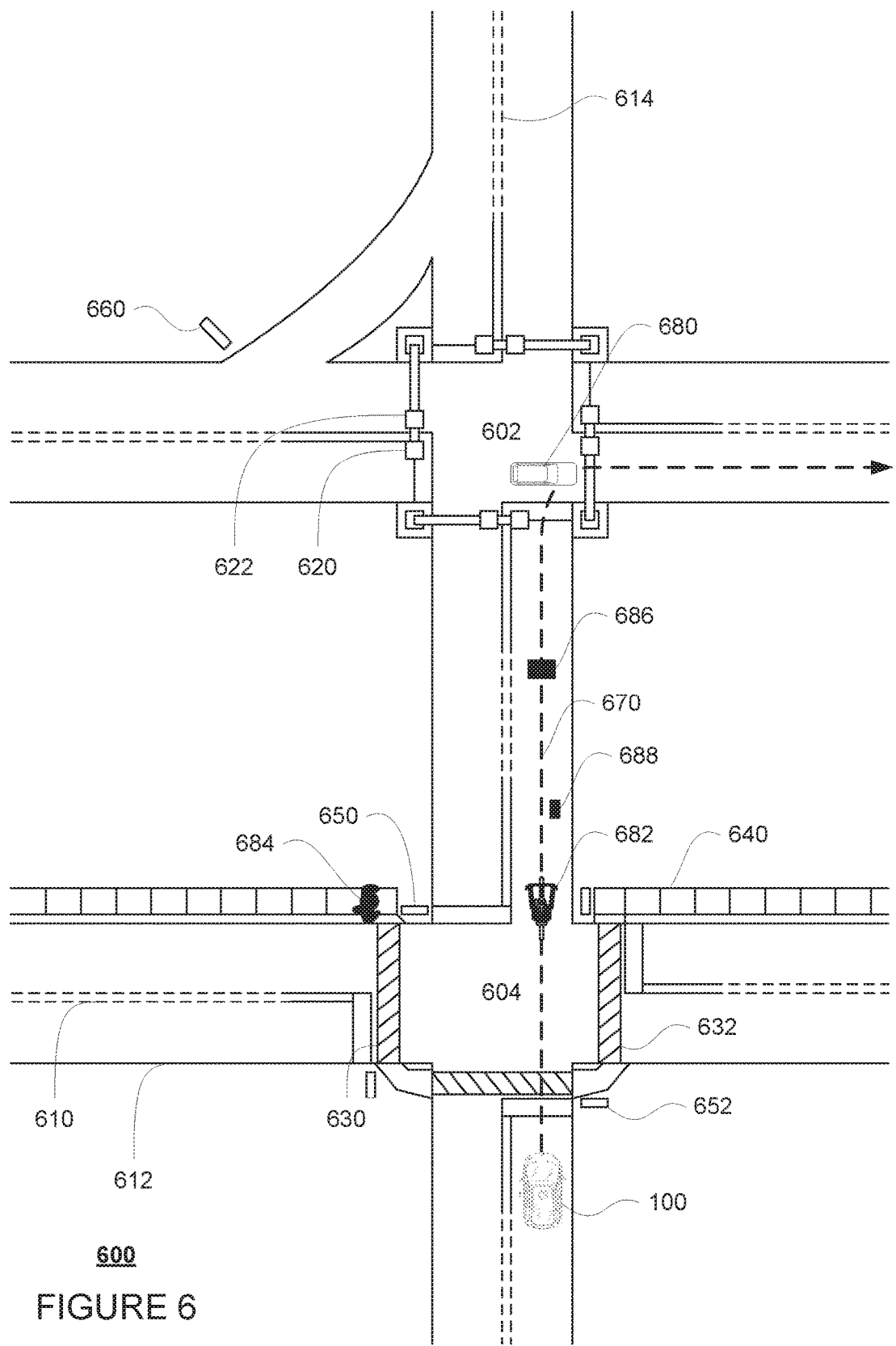
FIG. 6 is an example situation in accordance with aspects of the disclosure.

FIG. 6 depicts a section of roadway 600 including intersections 602 and 604. In this example, intersections 602 and 604 correspond to intersections 202 and 204 of the map information 200, respectively. In this example, lane lines 610, 612, and 614 correspond to the shape, location, and other characteristics of lane lines 210, 212, and 214, respectively. Similarly, crosswalks 630 and 632 correspond to the shape, location, and other characteristics of crosswalks 230 and 232, respectively; sidewalks 640 correspond to sidewalks 240; traffic signal lights 620 and 622 correspond to traffic signal lights 220 and 222, respectively; stop signs 650, 652 correspond to stop signs 250, 252, respectively; and yield sign 660 corresponds to yield sign 260.

In the example of FIG. 6, vehicle 100 is traveling along a route according to an expected future path 670 which passes through intersections 604 and 602 and involves making a right-hand turn at intersection 602. In this example, the expected future path also corresponds to the rails of FIG. 2 and the detailed map information discussed above. The examples provided herein, including that of FIG. 6, are specific to left-hand drive countries, but may be equally as relevant to right-hand drive countries (assuming the directions of lanes and turns were reversed, etc.).

As the vehicle is maneuvered along and the perception system 172 detects objects in the vehicle's environment, the perception system may provide sensor information to the computing device 110. As noted above, this sensor information may identify the characteristics detected by the sensors of the perception system in the vehicle's environment. As shown in the example of FIG. 6, the perception system 172 has detected and identified a vehicle 680, a bicyclist 682, and a pedestrian 684. In addition, the perception system has detected objects 686 and 688 that do not correspond to vehicles, bicyclists or pedestrians.

The computing device 110 and/or the perception system 172 may process the sensor information to identify a set of relevant objects for classification. For instance, the sensor information for a detected object which was not included in or otherwise identified by the detailed map information may be identified as relevant for classification. In order to further limit unnecessary classification of objects, the computing device 110 may identify objects relevant for classification based on their location, such as whether the object is in the same lane as the vehicle or near the vehicle's expected future path, such as where the computing device 110 is preparing to change lanes, turn, or otherwise drive towards the object according to the route. In other words, the computing device 110 and/or the perception system 172 may identify as relevant for classification objects that the vehicle may potentially drive over if the vehicle continues on a current route or trajectory.

For instance, each of the vehicle 680, bicyclist 682, pedestrian 684, and objects 686 and 688 may not appear in the detailed map information. In that regard, these objects may at least initially be included in a set of relevant objects for classification. The pedestrian 684 however, may not be included in or may be filtered from the set of objects as the location of pedestrian may be too far from the expected future path 670. Similarly, each of vehicle 680, bicyclist 682, and objects 686 and 688 may be directly in (or sufficiently close to) the expected future path 670 and may therefore be included in the set of relevant objects for classification.

Other characteristics defined in the sensor information for an object may be used to identify and/or filter the set of objects relevant for classification. For example, the computing device 110 and/or the perception system 172 may filter for objects for which drivability is not clear based on geometry (size or shape). As an example, if the height of an object, such as object 686, is very tall, such as close to the height of the bumper of vehicle 100 or taller, it is unlikely that a vehicle could safely drive or should ever over that object and therefore again, further classification is not necessary. Similarly, if an object has a jagged or sharp shape, it is unlikely that a vehicle could safely drive or should ever over that object and therefore again, further classification is not necessary.

In addition, the heading and velocity of an object may also be relevant to identify and/or filter objects relevant for classification. For instance, an object that is far from the vehicle's expected path, but approaching the vehicle's expected path may be relevant for classification.

In addition, the type of some objects may be automatically classified by the computing device 110 and/or the perception system 172 as noted above based on the characteristics defined in the sensor information based on size, shape, speed, and location as pedestrians, bicyclists, other vehicles etc. In this regard, none of vehicle 680, bicyclist 682, or pedestrian 684 may be included in the set of objects. As these objects should never be driven over, and further classification as drivable or not drivable is not necessary, and can be avoided in order to reduce the amount of processing power utilized by the classifier.

The sensor information corresponding to the set of objects identified as relevant for classification may then be fed by the computing device 110 into the classifier. Thus, by excluding vehicles, bicyclists, and pedestrians as well as objects that are too tall (for instance, object 686) or have a particular shape, the set of objects relevant for classification may include only object 688. The classifier may then classify the drivability of each of the objects using the aforementioned sensor information. As noted above, the aforementioned sensor information may be fed into the model. The classifier may then output a classification, such as drivable, drivable if straddled, not drivable, and/or not drivable but likely to move away on its own as well as an associated confidence value for each such classification.

The computing device 110 may then use the classification (or classifications) and associated confidence value (or values) to make a determination as to whether it is safe or not for the vehicle to drive over the object in real time, for instance, as the vehicle approaches the object. For instance, this confidence value may be compared with the one or more threshold values of data 134 to determine whether the object is drivable, or rather, whether the vehicle can safely drive over the object. In this regard, each classification designation (drivable, drivable if straddled, not drivable, or not drivable but likely to move away on its own), may be associated with a different one of the one or more threshold values. In that regard, each threshold value may be used for comparison with the confidence values of one of the classification designations.

As an example, the threshold value for identifying an object as drivable may be relatively high, or on a scale from 0 to 1, closer to 1 or 0.9 (90%), in order to reduce the likelihood of driving over an object that was actually not drivable but was possibly misclassified by the classifier. In this regard, where object 686 is classified as 0.05 or 5% likely to be drivable, as this is less than 0.9, the computing device 110 may determine that the object is not drivable. Where an object is classified as 0.95 or 95% likely to be drivable, as this is greater than 0.9, the computing device 110 may determine that the object is drivable.

The threshold value for identifying an object as drivable if straddled may be relatively high, but lower than that for a drivable object, or on a scale of 0 to 1, closer to 0 or 0.80 (80%), again in order to err on the side of not driving over an object that was not actually drivable. In this regard, where object 686 is classified as 0.85 or 85% likely to be drivable if straddled, as this is greater than 0.80, the computing device 110 may determine that the object is drivable only if the object is straddled by the wheels of the vehicle. Where an object is classified as 0.75 or 75% likely to be drivable if straddled, as this is less than 0.80, the computing device 110 may determine that some other classification is more appropriate, for instance, not drivable.

Similarly, the threshold value for identifying an object as not drivable may be relatively low, or on a scale of 0 to 1, closer to 0 or 0.25 (25%), again in order to err on the side of not driving over an object that was not actually drivable. In this regard, where object 686 is classified as 0.95 or 95% likely to be not drivable, as this is greater than 0.25, the computing device 110 may determine that the object is not drivable. Where an object is classified as 0.05 or 5% likely to be not drivable, as this is less than 0.25, the computing device 110 may determine that the object is not drivable.

In another example, the threshold value for identifying an object as not drivable but likely to move away on its own may also be relatively high, or on a scale from 0 to 1, closer to 1 or 0.9, in order to reduce the likelihood of driving over an object that will not move away on its own, but was possibly misclassified by the classifier. In this regard, where object 686 is classified as 0.8 or 80% not drivable but likely to move away on its own, as this is less than 0.9, the computing device 110 may determine that the object is not likely to move away on its own and therefore also not drivable. Thus, some other classification, such as not drivable, may be more appropriate. Where object 686 is classified as 0.95 or 95% not drivable but likely to move away on its own, as this is greater than 0.9, the computing device 110 may determine that the object is not drivable but likely to move away on its own.

The determination may then be used to control the vehicle. For instance, if object 686 is determined to be drivable, the computing device 110 may cause the vehicle to proceed to drive over the object. If object 686 is classified as drivable if straddled, the computing device 110 may cause the vehicle maneuver to drive over the object such that the object is positioned between the wheels (i.e. driver and passenger side wheels) of the vehicle. If object 686 is classified as not drivable, the computing device 110 may cause the vehicle to stop or maneuver around the object. In addition, if object 686 is classified as not drivable but likely to move away on its own, the computing device 110 may cause the vehicle to slow down as the vehicle approaches the object, in order to give the object a greater amount of time to move out of the expected future path of the vehicle before the vehicle reaches the object. Of course, if the object does not move out of the expected future path of the vehicle, the computing device 110 may cause the vehicle to come to a complete stop or maneuver the vehicle around the object.

In some examples, the classification of the object may be combined with other information determined about the object such as its size and sub-classification of type in order to determine an appropriate vehicle response. For instance, the computing devices may slow down slightly for small objects that are drivable, but slow down more for larger objects that are drivable. Similarly, the computing devices may slow down the vehicle slightly as it approaches an object classified as not drivable but likely to move out of the way on their own and sub-classified as a small animal such as a bird, but thereafter slow down the vehicle much more rapidly (faster) if object does not move out of the way when the vehicle is some predetermined distance from the object.

Of course, the aforementioned thresholds and determinations are merely examples, as the confidence values will be determined by the classifier and the threshold values used may be adjusted or not necessarily required. For instance, rather than a singular threshold value, the confidence values output by the classifier may be used by the computing devices which controls the speed of the vehicle (slowing down gradually, stopping etc.) as a function of the confidence value. When the confidence value that an object is not drivable is relatively high, this function may cause an abrupt stop whereas when the confidence value that an object is drivable is relatively high, the same function may cause a more gradual slowing of the vehicle or no change in the speed of the vehicle at all. The function may also take into consideration additional variables such as the size of the object, the speed limit of the roadway on which the vehicle is currently being driven, the distance between the vehicle and another vehicle behind the vehicle in the same lane as the vehicle (for instance, whether there is another vehicle tailgating the vehicle), the speed of another vehicle behind the vehicle in the same lane as the vehicle, etc. in order to improve the determination of how to control the vehicle.

In some examples, the classification may be an iterative process. For instance, after classifying an object as not drivable, the object may then be classified again, using a different classifier trained as discussed above, to determine whether or not the not drivable object is likely to move out of the way on its own.

Figure 7:
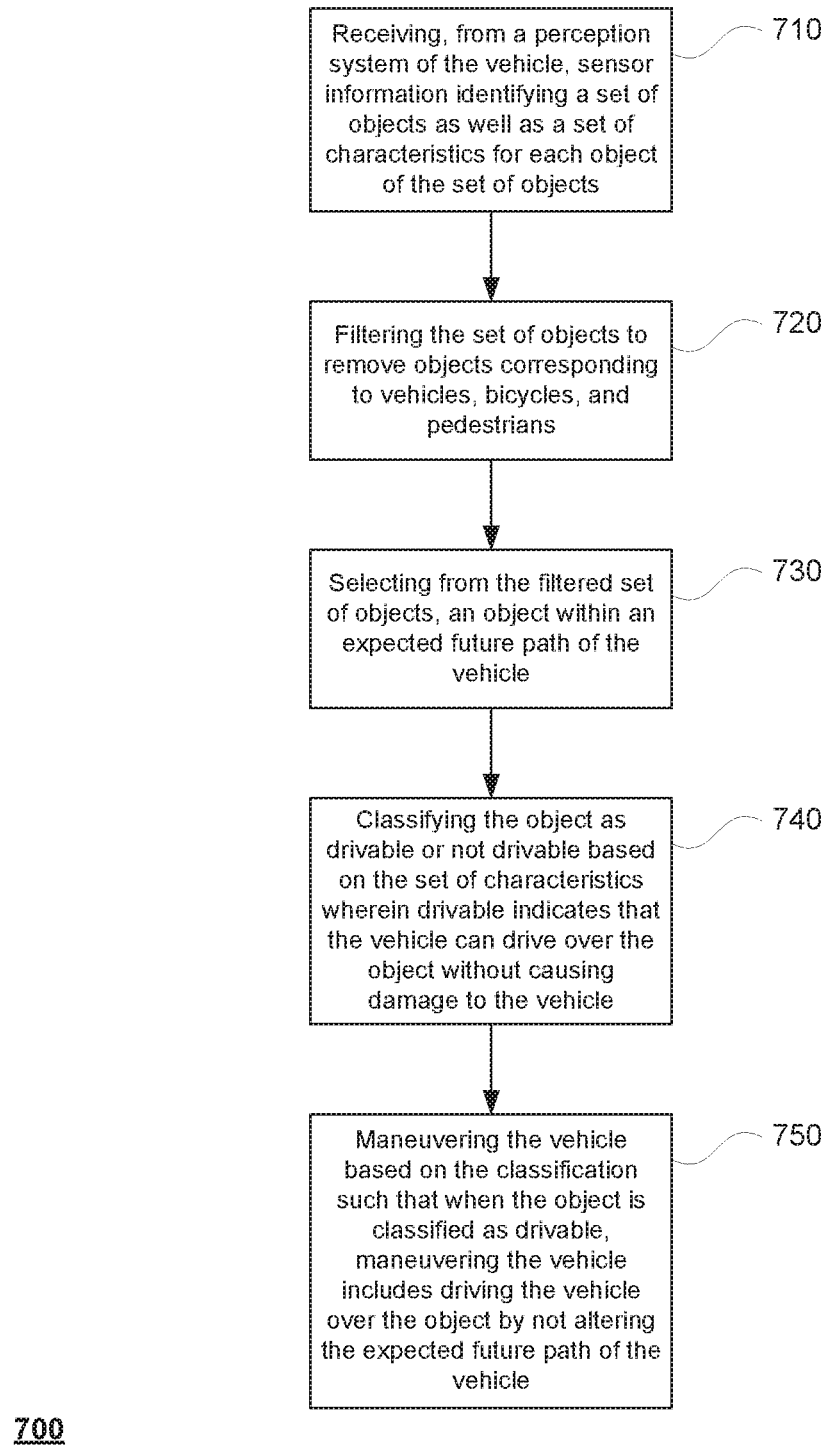
FIG. 7 is a flow diagram in accordance with aspects of the disclosure.

FIG. 7 is an example flow diagram 700 of maneuvering a vehicle, such as vehicle 100, autonomously which may be performed by one or more computing devices, such as computing device 110. In this example, the one or more computing devices receive, from a perception system of the vehicle, sensor information identifying a set of objects as well as a set of characteristics for each object of the set of objects at block 710. The set of objects is filtered to remove objects corresponding to vehicles, bicycles, and pedestrians at block 720. An object within an expected future path of the vehicle is selected from the filtered set of objects at block 730. The object is classified as drivable or not drivable based on the set of characteristics wherein drivable indicates that the vehicle can drive over the object without causing damage to the vehicle at block 740. The vehicle is maneuvered based on the classification such that when the object is classified as drivable, maneuvering the vehicle includes driving the vehicle over the object by not altering the expected future path of the vehicle at block 750.

In addition to the benefits discussed above, by classifying the drivability of objects, the vehicle's computing devices may also improve predictions of how other objects, such as vehicles or bicyclists will behave. For instance, if vehicle 100's computing devices 110 classify an object in another vehicle's lane as drivable, the vehicle's computing devices may predict that the other vehicle to drive over the object. At the same time if the vehicle 100's computing devices classify that object as not drivable, the vehicle's computing devices may predict that the other vehicle will stop or drive around the object (potentially entering the lane of the vehicle 100).

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of maneuvering a vehicle, the method comprising:
   receiving, by one or more processors from a perception system of the vehicle, sensor information identifying a set of objects as well as a set of characteristics for each object of the set of objects;
   filtering, by the one or more processors, the set of objects to remove objects corresponding to vehicles, bicycles, and pedestrians;
   selecting, by the one or more processors, from the filtered set of objects, an object within an expected future path of the vehicle;
   classifying, by the one or more processors, the object as drivable or not drivable based on the set of characteristics for the object, wherein drivable indicates that the vehicle can drive over the object without causing damage to the vehicle; and
   maneuvering, by the one or more processors, the vehicle based on the classification such that when the object is classified as drivable, maneuvering the vehicle includes driving the vehicle over the object by not altering the expected future path of the vehicle.

2. The method of claim 1, wherein the set of characteristics includes a location of the object, and the method further comprises prior to classifying, determining that the object was not included in pre-stored map information describing a driving environment of the vehicle at the location.

3. The method of claim 1, wherein the receiving of the sensor information occurs when the vehicle is approaching the object such that the classification and maneuvering are performed in real time.

4. The method of claim 1, wherein when the classification is not drivable, maneuvering the vehicle includes altering the expected future path of the vehicle to avoid driving over the object.

5. The method of claim 1, further comprising, when an object is classified as not drivable, further classifying the object as not drivable but likely to move out of expected future path of the vehicle.

6. The method of claim 5, wherein when the object is classified as not drivable but likely to move out of the expected future path of the vehicle, maneuvering the vehicle includes slowing the vehicle down as the vehicle approaches the object.

7. The method of claim 1, wherein the filtering further includes filtering the set of objects to remove objects not within a lane in which the vehicle is currently traveling.

8. The method of claim 1, wherein the filtering further includes filtering the set of objects to remove objects having a height that meets a predetermined height threshold.

9. The method of claim 1, wherein the filtering further includes filtering the set of objects to remove objects having a predetermined shape.

10. The method of claim 1, wherein classifying, by the one or more processors, the object as drivable further includes:
    classifying the object as drivable if straddled between two wheels of the vehicle, and
    wherein when the object is classified as drivable if straddled between two wheels of the vehicle, maneuvering the vehicle based on the classification includes maneuvering the vehicle in order to straddle the object between the two wheels of the vehicle.

11. A system for maneuvering a vehicle, the system comprising one or more processors configured to:
    receive, from a perception system of the vehicle, sensor information identifying a set of objects as well as a set of characteristics for each object of the set of objects;
    filter the set of objects to remove objects corresponding to vehicles, bicycles, and pedestrians;
    select from the filtered set of objects, an object within an expected future path of the vehicle;
    classify the object as drivable or not drivable based on the set of characteristics for the object, wherein drivable indicates that the vehicle can drive over the object without causing damage to the vehicle; and
    maneuver the vehicle based on the classification such that when the object is classified as drivable, maneuvering the vehicle includes driving the vehicle over the object by not altering the expected future path of the vehicle.

12. The system of claim 11, further comprising the vehicle.

13. The system of claim 11, wherein the set of characteristics includes a location of the object, and the one or more processors are further configured to, prior to classifying, determining that the object was not included in pre-stored map information describing a driving environment of the vehicle at the location.

14. The system of claim 11, wherein the one or more processors are further configured such that when the receiving of the sensor information occurs when the vehicle is approaching the object, the classification and maneuvering are performed in real time.

15. The system of claim 11, wherein when the classification is not drivable, the one or more processors are further configured to maneuver the vehicle by altering the expected future path of the vehicle to avoid driving over the object.

16. The system of claim 11, when an object is classified as not drivable, the one or more processors are further configured to further classify the object as not drivable but likely to move out of the expected future path of the vehicle.

17. The system of claim 11, wherein the one or more processors are further configured to filter the set of objects by also removing objects not within a lane in which the vehicle is currently traveling.

18. The system of claim 11, wherein the one or more processors are further configured to filter the set of objects by also removing objects having a height that meets a predetermined height threshold.

19. The system of claim 11, wherein the one or more processors are further configured to filter the set of objects by also removing objects having a predetermined shape.

20. A non-transitory computer readable storage medium on which instructions are stored, the instructions, when executed by one or more processors cause the one or more processors to perform a method for maneuvering a vehicle, the method comprising:
- receiving, from a perception system of the vehicle, sensor information identifying a set of objects as well as a set of characteristics for each object of the set of objects;
- filtering the set of objects to remove objects corresponding to vehicles, bicycles, and pedestrians;
- selecting from the filtered set of objects, an object within an expected future path of the vehicle;
- classifying the object as drivable or not drivable based on the set of characteristics for the object, wherein drivable indicates that the vehicle can drive over the object without causing damage to the vehicle; and
- maneuvering the vehicle based on the classification such that when the object is classified as drivable, maneuvering the vehicle includes driving the vehicle over the object by not altering the expected future path of the vehicle.

\* \* \* \* \*